US006898981B1

(12) United States Patent
Boillat et al.

(10) Patent No.: US 6,898,981 B1
(45) Date of Patent: May 31, 2005

(54) DEVICE FOR MEASURING PRESSURE IN TWO POINTS OF A FLUID FLOW

(75) Inventors: Marc Boillat, Auvernier (CH); Bart Van Der Schoot, Neuchâtel (CH); Nico De Rooij, Bôle (CH); Benedikt Guldimann, Berkeley, CA (US)

(73) Assignee: Seyonic SA, Neuchatel (CH)

( * ) Notice: Subject to any disclaimer, the term of this patent is extended or adjusted under 35 U.S.C. 154(b) by 48 days.

(21) Appl. No.: 10/469,322

(22) PCT Filed: Feb. 21, 2002

(86) PCT No.: PCT/CH02/00101

§ 371 (c)(1),
(2), (4) Date: Aug. 27, 2003

(87) PCT Pub. No.: WO02/071001

PCT Pub. Date: Sep. 12, 2002

(30) Foreign Application Priority Data

Mar. 1, 2001 (EP) .................................. 01810210

(51) Int. Cl.$^7$ ............................................. G01L 7/00
(52) U.S. Cl. ...................................................... 73/756
(58) Field of Search .......................... 73/706, 714, 756, 73/730, 861.42, 861.52–861.64

(56) References Cited

U.S. PATENT DOCUMENTS

| 4,565,096 A | | 1/1986 | Knecht ........................ 73/718 |
| 4,596,149 A | * | 6/1986 | Frantz ........................ 73/756 |
| 5,959,213 A | | 9/1999 | Ikeda et al. .................... 73/720 |
| 5,969,591 A | | 10/1999 | Fung ............................ 338/42 |

FOREIGN PATENT DOCUMENTS

| DE | 199 27 970 A1 | 6/2000 | ........... H01L 49/00 |

OTHER PUBLICATIONS

Boillat, M. et al. "A differential pressure liquid flow sensor for flow regulation and dosing systems"*Proceedings of the Workshop on Micro Electrical Mechanical Systems (MEMS)* Amsterdam, Jan. 29-Feb. 2, 1995; New York, IEEE, vol. Workshop 8, pp. 350-352, Jan. 29, 1995.

Boillat, M. et al. "High precision piezo-resistive sensing techniques for micro-dosing applications"*Proceedings Sensor Expo*. Cleveland, 1999 no month.

Middelhoek, S. et al. "Silicon sensors" (ISBN 0-12-495051-5) no date.

Clerc, P.-A. et al. *J. Micromech. Microeng.* 8: 272-278; 1998 no month.

Peeters, E. "Process development for 3D silicon microstructures" Catholic University of Louvain no date.

* cited by examiner

Primary Examiner—William Oen

(57) ABSTRACT

The invention concerns a device for measuring pressure in two points of a fluid flow, comprising: a frame (10) consisting of two plates (12, 14) comprising each two planar surfaces, one outer (12a, 14a) and the other inner (12b, 14b), and wherein one of the plates (12) is perforated with recess (22) closed by the other plate (14) to form an assembly of two chambers (28, 30) comprising two planar walls (24, 14b) parallel to the surfaces (12a, 14a) of the frame and a side wall (26) forming its periphery and a fluidic restriction channel (32) connecting the two chambers (28, 30) with each other, and means (16) for supplying a measurement of the pressure in each of the chambers (28, 30). In order to improve the accuracy of the measurement, the side wall (26) of the chambers (28, 30) is perpendicular to its two planar walls (24, 14b) and is configured such that the chambers (28, 20) are spindle-shaped.

6 Claims, 2 Drawing Sheets

DEVICE FOR MEASURING PRESSURE IN TWO POINTS OF A FLUID FLOW

Figure 1:
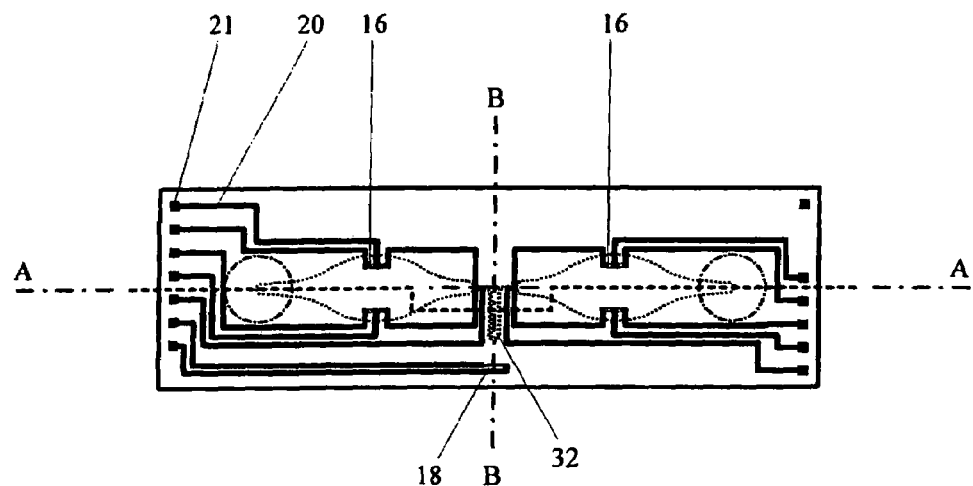

This application is a 371 of PCT/CH02/00101, filed Feb. 21, 2002.

The present invention relates to devices for measuring pressure at two points of a fluid flow. It concerns, more particularly, a device of the type including:

a frame formed of two plates each including two planar surfaces, one outer and the other inner, the two inner surfaces being mounted on each other, and wherein one of the plates is provided with a recess closed by the other plate to form together two chambers including two planar walls parallel to the surfaces of the frame and a side wall forming its periphery and a fluidic restrictor channel connecting the two chambers, said frame including two apertures respectively connecting the two chambers to the exterior to allow a fluid to flow therein, and means for supplying a measurement of the pressure in each of the chambers.

Such a device is, for example, described in the publications entitled "High Precision Piezo-Resistive Sensing Techniques for Micro-Dosing Applications" (M. Boillat et al. Proceedings Sensor Expo Cleveland 1999) and "A Differential Pressure Liquid Flow Sensor for Flow Regulation and Dosing Systems" (M. Boillat et al. 0-7803-2503-6© 1995 IEEE). The plate provided with a recess is made of monocrystalline silicon (100), the recess being made by chemical etching, whereas the other plate is made of glass. The pressure measurement is carried out by means of two piezo-resistive transducers respectively arranged on the outer surface of the etched plate facing the two chambers and connected in a Wheatstone bridge configuration.

Because the recess is made by silicon etching, it has an isosceles trapeze shaped section whose large base and sides form an angle of approximately 54°. Moreover, the side wall, defining a rectangular contour, is formed of planar surfaces mounted on each other.

With such a structure, it can happen that, during filling by means of a liquid, gas bubbles remain trapped in one or other of the chambers and considerably affect the precision of the measurement because of their elasticity.

It is thus an object of the present invention to provide a device that prevents such bubbles from remaining trapped, and thus allows a pressure measurement offering maximum measurement precision and security to be carried out.

More precisely, the invention concerns a device of the type previously described, but which, in order to achieve the aforementioned object, is characterized in that the side wall of the two chambers is shaped such that they are spindle-shaped, or in other words fusiform.

Advantageously, the side wall of the two chambers is substantially perpendicular to its two planar walls. Moreover, the two chambers are aligned along the longitudinal axis of the frame and arranged symmetrically with respect to its transverse axis.

According to a preferred embodiment, the bottom wall of the recess forms a membrane that can be deformed elastically via the effect of the pressure in each of the two chambers and the measurement means include two electromechanical transducers respectively arranged facing the chambers, outside the membrane. In this case, each transducer is advantageously formed of two pairs of piezo-resistors, interconnected so as to form a Wheatstone bridge and arranged symmetrically with respect to the longitudinal axis of the frame, the two piezo-resistors of each pair being arranged symmetrically with respect to the transverse axis of the chamber.

Finally, it is advantageous to provide the device with a temperature sensor arranged on one of the plates in proximity to the fluid flow such that the measured temperature corresponds to that of the liquid concerned. It is thus possible to determine the liquid flow rate with precision.

Figure 2:
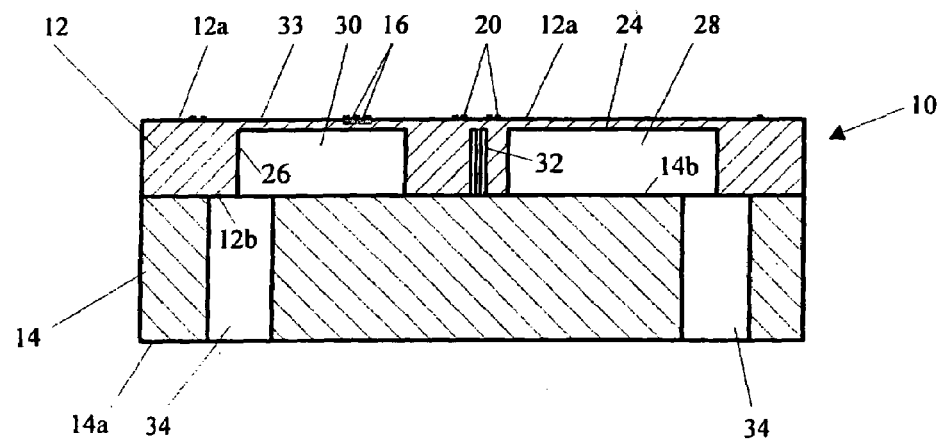
Figure 3:
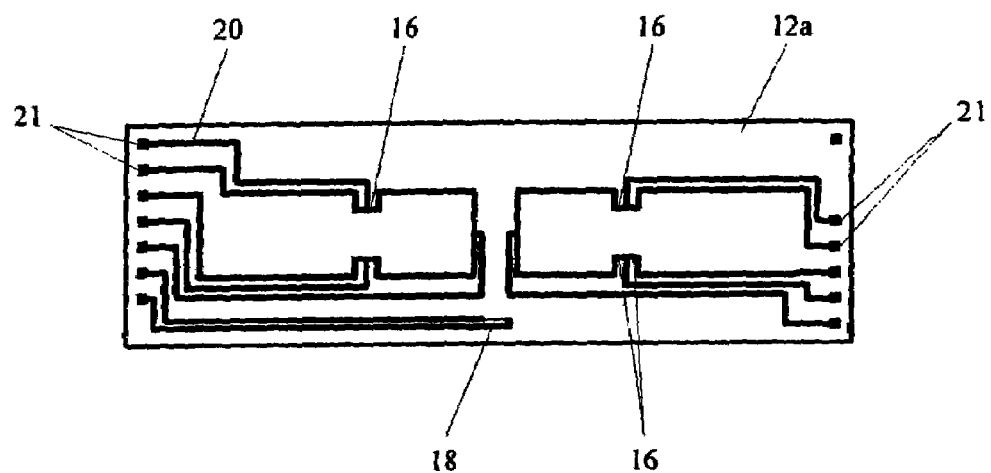
Figure 4:
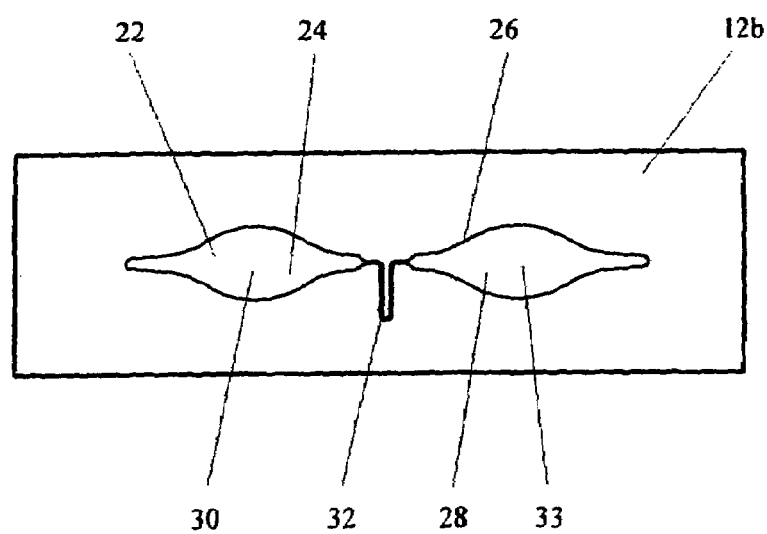

Other features and advantages of the invention will appear from the following description, made with reference to the annexed drawing, in which:

FIGS. 1 and 2 show, respectively plan and cross-sectional views of a device according to the invention, and FIGS. 3 and 4 show the base plate of the device, seen respectively from above and below.

The drawing shows a device including an envelope 10 formed of a base plate 12 made of mono-crystalline silicon and a glass strip 14 acting as a cover. Plate 12 and strip 14 each include two large planar surfaces, one outer, identified by the letter a, and the other inner, identified by the letter b and mounted on each other by welding.

Envelope 10 is of generally parallelepiped shape, 10 mm in length along a longitudinal axis A—A, 3 mm wide along a transverse axis B—B, and approximately 1 mm thick, with large surfaces respectively defined by the outer surfaces 12a of plate 12 and 14a of strip 14, parallel to each other and to the assembled surfaces 12b and 14b. The other surfaces of envelope 10 are formed by the edges of plate 12 and strip 14.

Envelope 10 carries, on its outer surface 12a (FIG. 3), eight piezo-resistors 16 arranged symmetrically in two groups of four with respect to the transverse axis B—B of the parallelepiped. Each group is formed of two pairs of piezo-resistors arranged symmetrically with respect to longitudinal axis A—A.

Envelope 10 also carries, on surface 12a, a thermo-resistor 18 arranged substantially in the middle of one of the large sides of the parallelepiped. This thermo-resistor is used to measure the temperature of the device.

A network of conductive paths 20 connects the four piezo-resistors 16 of each group to each other so as to form two Wheatstone bridges forming two transducers whose function will appear hereinafter. These paths also ensure the electrical connection of the two bridges, and that of thermo-resistor 18, to terminals 21 arranged at both ends of surface 12a.

As FIG. 4 shows, surface 12b of plate 12, intended to be mounted on plate 14, has a recess 22 whose bottom 24 is parallel to surfaces 12a and 14a, and whose wall 26, substantially perpendicular to bottom 24, is shaped so as to form, with surface 14b of plate 14, two spindle-shaped chambers, an inlet chamber 28, the other an outlet chamber 30, aligned along longitudinal axis A—A of the device and arranged symmetrically with respect to its transverse axis B—B so that the median part of each is facing the four piezo-resistors 16 of each group. It will be noted that the two piezo-resistors of each pair are arranged symmetrically with respect to the transverse axis of the chamber, parallel to axis B—B.

The two chambers 28 and 30 communicate with each other via a channel 32 arranged in plate 12 to form a U-shaped fluidic restrictor. Thermo-resistor 18 is in immediate proximity to channel 32, such that the temperature of the plate at this place perfectly corresponds to that of the liquid contained in the channel.

In its part comprised between wall 12a and bottom 24, plate 12 has a sufficiently small thickness, typically 15 μm, to form an elastically deformable membrane 33. It is on this membrane that piezo-resistors 16 are arranged, such that a difference in pressure between the two chambers 28 and 30 can be measured by means of the electromechanical transducers formed by the two Wheatstone bridges.

Two cylindrical holes 34, made in strip 14 and oriented perpendicularly to plate 12, form apertures for respectively connecting chambers 28 and 30 to the exterior of envelope 10. These holes open out into the chambers at their ends opposite to fluidic restrictor 32.

In the device described, the liquid enters one of holes 34 and leaves by the other, after passing through chamber 28, fluidic restrictor 32 and chamber 30.

Such a device is manufactured from mono-crystalline silicon wafers, like those used for manufacturing integrated circuits. Several tens of devices can be manufactured simultaneously on each of these wafers.

The first step of the method consists in forming, on one of the surfaces of the wafer, piezo-resistors 16, thermo-resistor 18, conductive paths 20 and terminals 21, by means of techniques used, conventionally, in the manufacture of integrated circuits, for example as described in the work entitled "Silicon sensors" by S. Middelhoek et al. (ISBN 0-12-495051-5).

The wafer is then turned over to etch chambers 28 and 30 and fluidic restrictor 32. This operation can, advantageously, be achieved by DRIE (Deep Reactive Ion Etching). This technique, described by P.-A. Clerc et al, in J. Micromech. Microeng. 8(1998) 272–278, allows recesses with a depth of up to 500 $\mu$m to be made. It also allows a fluidic restrictor 32 having a width of 50 $\mu$m to be made. It is, consequently, possible to obtain a low ratio between the section of restrictor 32 and that of chambers 28 and 30, which improves the measurement precision. This technique also allows walls forming, with the surfaces, an angle greater than 85°, i.e. substantially perpendicular, to be obtained.

Plate 12 and strip 14 are then prepared for assembly by anodic welding. The way in which such an assembly is achieved is described in the work entitled "Process development for 3D silicon microstructures" by Eric Peeters (Catholic University of Louvain). When this operation is completed, the wafer is sawn so as to separate the devices from each other.

The device as described allows not only a difference in pressure and a temperature to be measured, but also a flow rate. Indeed, as specified in the aforementioned publication by M. Boillat et al., the flow rate into a calibrated conduit is a function of the geometric dimensions of the conduit, the pressure difference and the viscosity of the liquid. Thus, for a given liquid, from the information collected via the thermo-resistor, it is possible to determine the liquid viscosity, the latter varying only as function of temperature. Transmission of information relating to the temperature and the pressure difference between the two chambers to an electronic measuring circuit thus allows the flow rate of the liquid concerned to be defined.

The device described, with a restrictor 32 having a length of 10 mm, a width of 50 $\mu$m and a height of 150 $\mu$m, allows flow rates of up to 10 $\mu$l/s to be measured, while remaining in laminar mode. It goes without saying that these features can vary significantly. They are selected as a function of the liquid concerned and its flow rate.

Thus, precision can be improved by increasing the length of the restrictor or by reducing the section. This results in an increase in the flow resistance, which requires higher pressure, to obtain the same flow. The maximum admissible flow rate is thus reduced.

What is claimed is:

1. Device for measuring pressure at two points of a fluid flow, including:
    a frame (10) formed of two plates (12, 14) each including two planar surfaces, one outer (12*a*, 14*a*) and the other inner (12*b*, 14*b*), the two inner surfaces being mounted on each other and wherein one of the plates (12) is provided with a recess (22) closed by the other plate (14) to form together two chambers (28, 30) including two planar walls (24, 14*b*) parallel to the surfaces (12*a*, 14*a*) of the frame and a side wall (26) forming its periphery and a fluidic restrictor channel (32) connecting the chambers (28, 30) to each other, said frame (10) including two apertures (34) respectively connecting the two chambers (28, 30) to the exterior to allow a fluid to flow therein, and
    means (16) for supplying a measurement of the pressure in each of said chambers (28, 30),
    characterized in that the side wall (26) of the two chambers (28, 30) is shaped such that they are spindle-shaped.

2. Device according to claim 1, characterized in that the side wall (26) of the two chambers (28, 30) is substantially perpendicular to its two planar walls (24, 14*b*).

3. Device according to claim 1, characterized in that the two chambers (28, 30) are aligned along the longitudinal axis (A—A) of the frame (10) and arranged symmetrically with respect to its transverse axis (B—B).

4. Device according to claim 1, characterized in that the bottom wall of the recess (22) forms an elastically deformable membrane (33) via the effect of the pressure in each of the two chambers (28, 30) and in that said means include two electromechanical transducers respectively arranged facing said chambers, outside said membrane.

5. Device according to claim 4, characterized in that each transducer is formed of two pairs of piezo-resistors (16) interconnected so as to form a Wheatstone bridge and symmetrically arranged with respect to the longitudinal axis (A—A) of the frame, the two piezo-resistors of each pair being symmetrically arranged with respect to the transverse axis of the chamber.

6. Device according to claim 1, characterized in that it further includes a temperature sensor (18) arranged on one of said plates, facing said channel (32).

* * * * *